United States Patent [19]

Woody et al.

[11] 4,004,417
[45] Jan. 25, 1977

[54] TORQUE CONVERTER WITH SPEED RESPONSIVE SLIP CLUTCH

[75] Inventors: Albert L. Woody, Peoria; Sidney J. Audiffred; Howard C. Steury, both of Washington, all of Ill.

[73] Assignee: Caterpillar Tractor Co., Peoria, Ill.

[22] Filed: May 6, 1974

[21] Appl. No.: 467,180

Related U.S. Application Data

[60] Division of Ser. No. 304,492, Nov. 7, 1972, Pat. No. 3,831,726, and a continuation of Ser. No. 86,793, Nov. 4, 1970, abandoned.

[52] U.S. Cl. .............................. 60/363; 192/3.57; 192/3.31; 192/3.33; 74/733
[51] Int. Cl.[2] ....................................... F16D 23/00
[58] Field of Search ............ 60/363, 347; 192/3.3, 192/3.31, 3.33, 103 FA

[56] References Cited

UNITED STATES PATENTS

| | | | |
|---|---|---|---|
| 3,202,018 | 8/1965 | Hilpert | 192/3.33 X |
| 3,224,537 | 12/1965 | Hilpert | 192/3.3 X |
| 3,384,209 | 5/1968 | Murphy | 192/3.33 |
| 3,478,621 | 11/1969 | Johnson et al. | 192/3.33 |
| 3,542,175 | 11/1970 | Olson | 192/109 F |
| 3,621,955 | 11/1971 | Black et al. | 192/3.33 |

*Primary Examiner*—Benjamin W. Wyche
*Attorney, Agent, or Firm*—Phillips, Moore, Weissenberger, Lempio & Stabala

[57] ABSTRACT

A drive train for vehicles such as earthmoving machines having a prime mover coupled in driving relation with ground wheels for the machine through a power input member and a power output member. One or more implements are coupled to the power input member. In order to selectively match or mismatch power delivered by the prime mover with varying power requirements for the implements and wheels, a hydraulically operated slipping clutch is arranged between the power input and output members for adjusting power delivery from the prime mover to the output member and wheels with a manual control for regulating hydraulic operation of the slipping clutch. In other embodiments, the power input and output members are portions of a torque converter, a centrifugal valve also being provided to operate the slipping clutch in response to rotational speed of an element in the drive train and under regulation of the manual control. Another embodiment includes the slipping clutch disposed in a fluid housing subject to variable pressure with the centrifugal valve being responsive to the variable fluid pressure. In another embodiment, controls for a transmission in the drive train are also operative to provide regulation of the slipping clutch.

2 Claims, 8 Drawing Figures

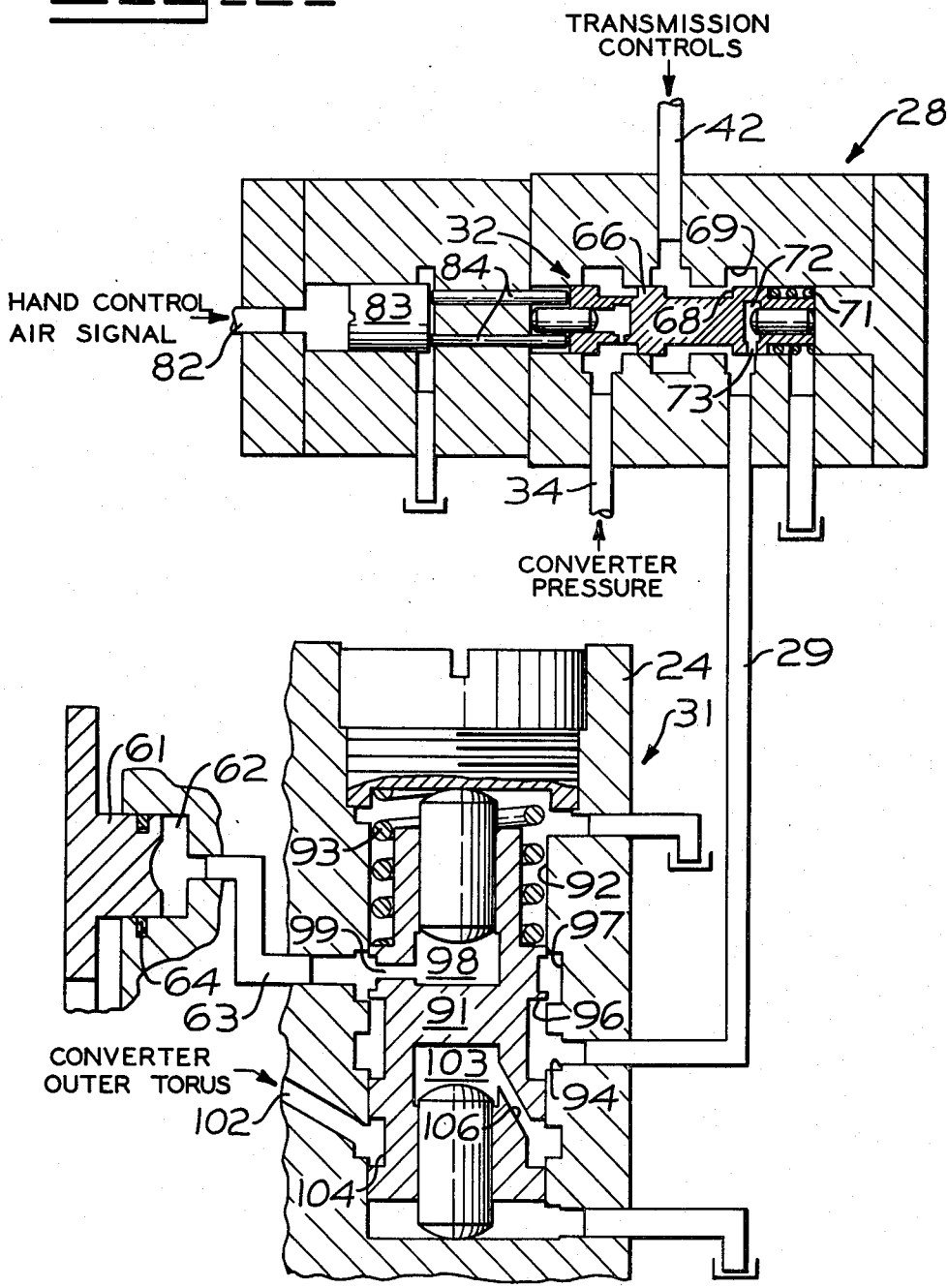

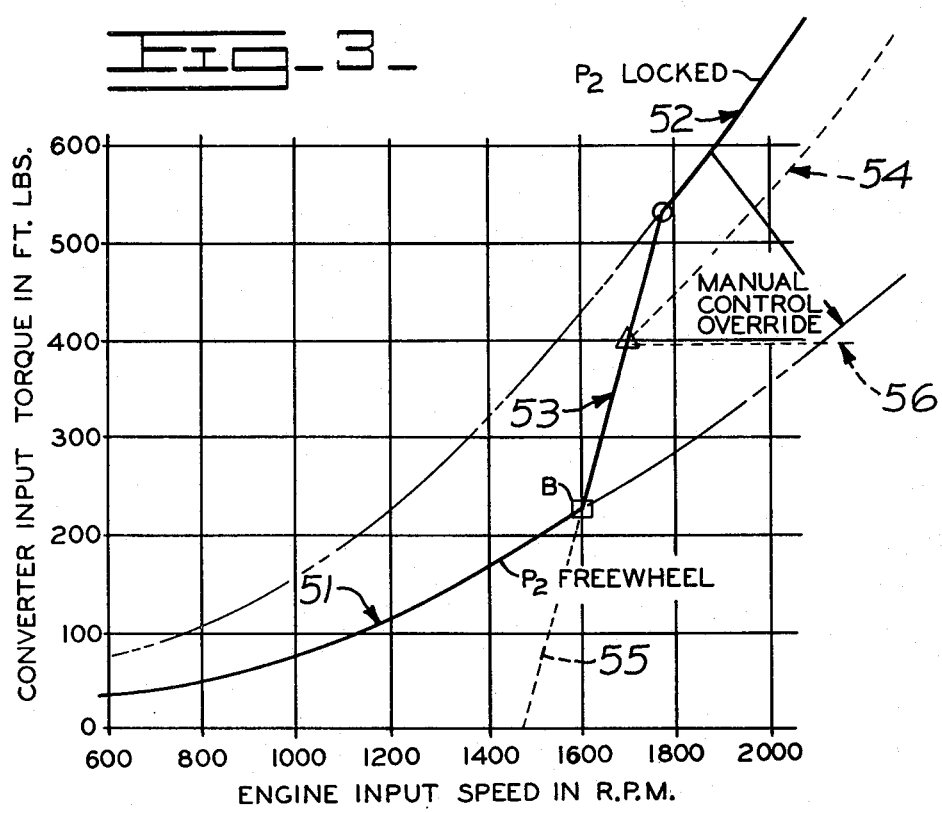
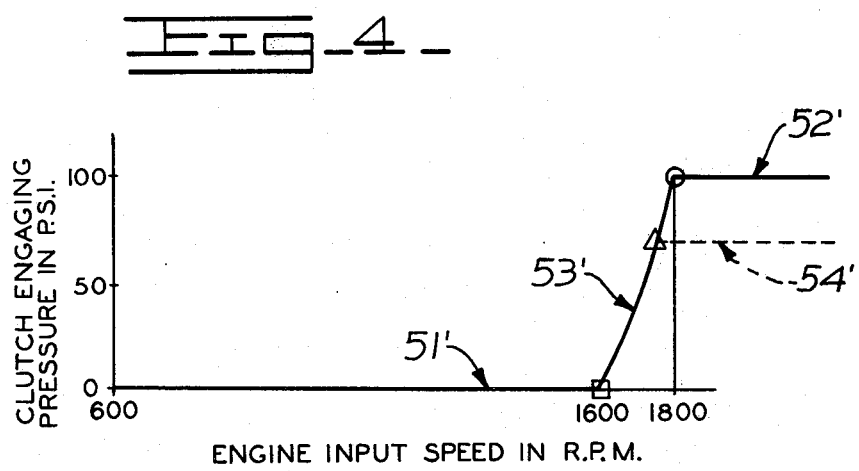

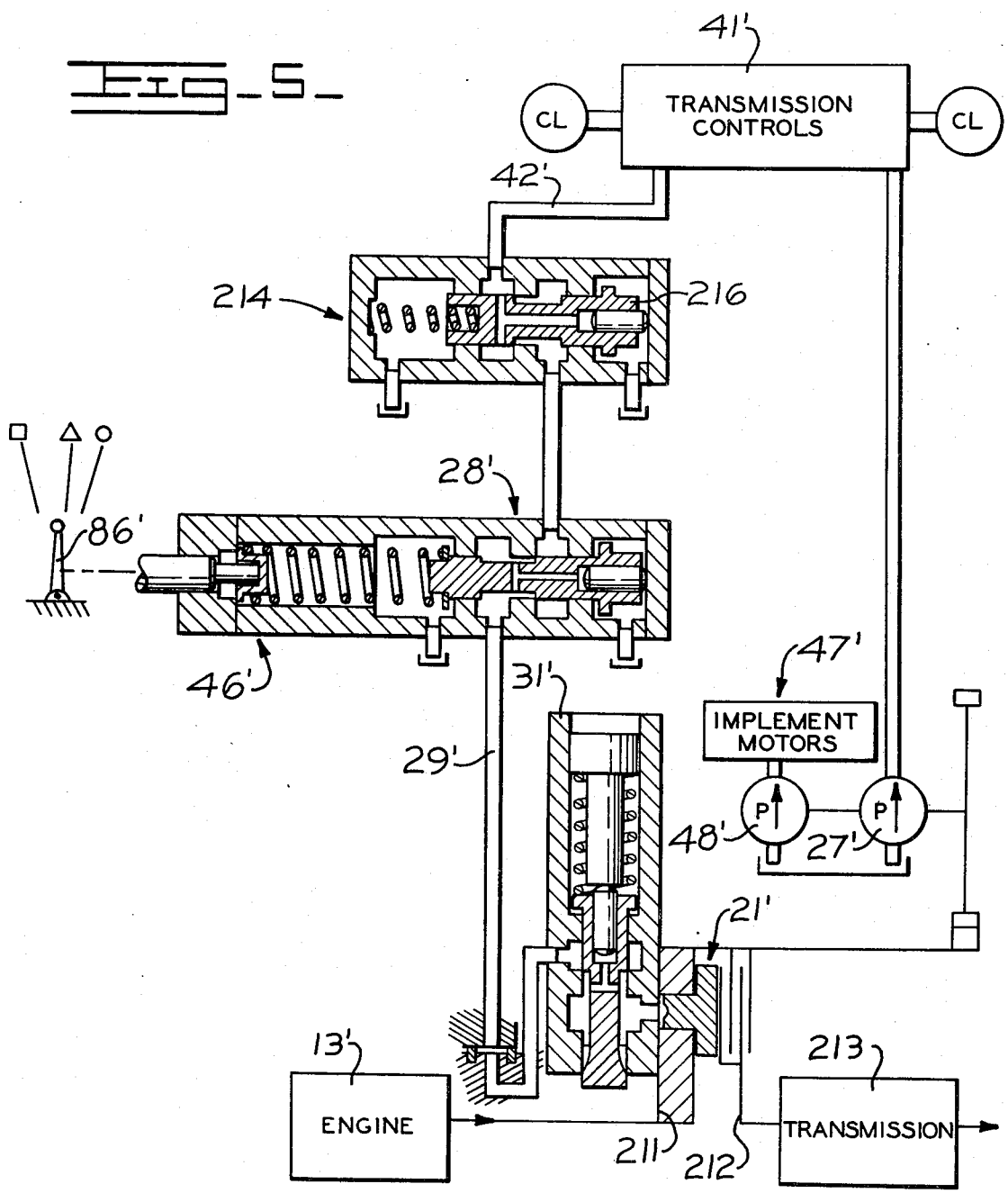

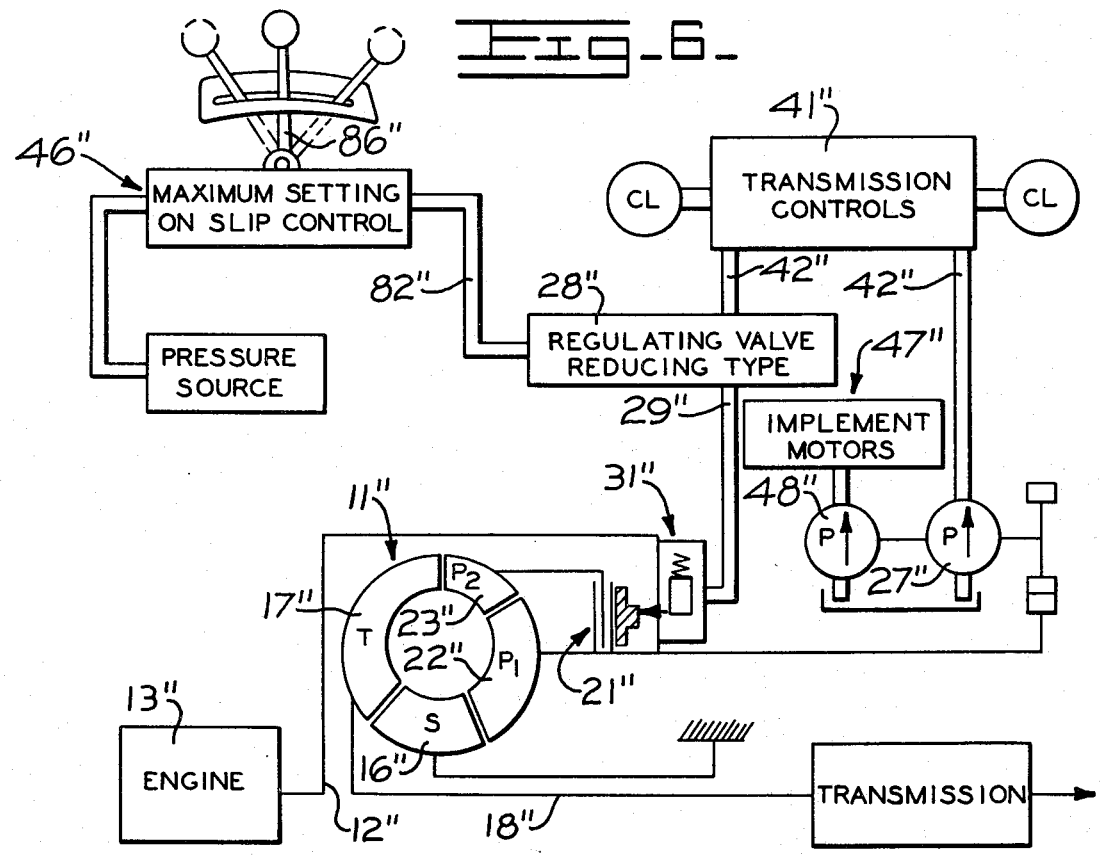
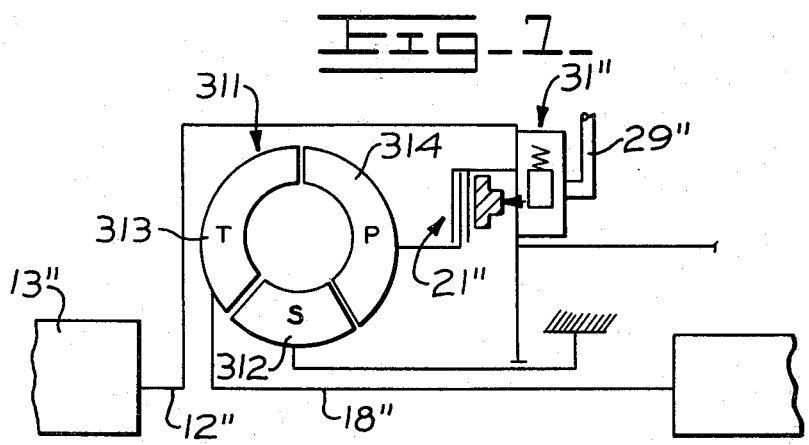

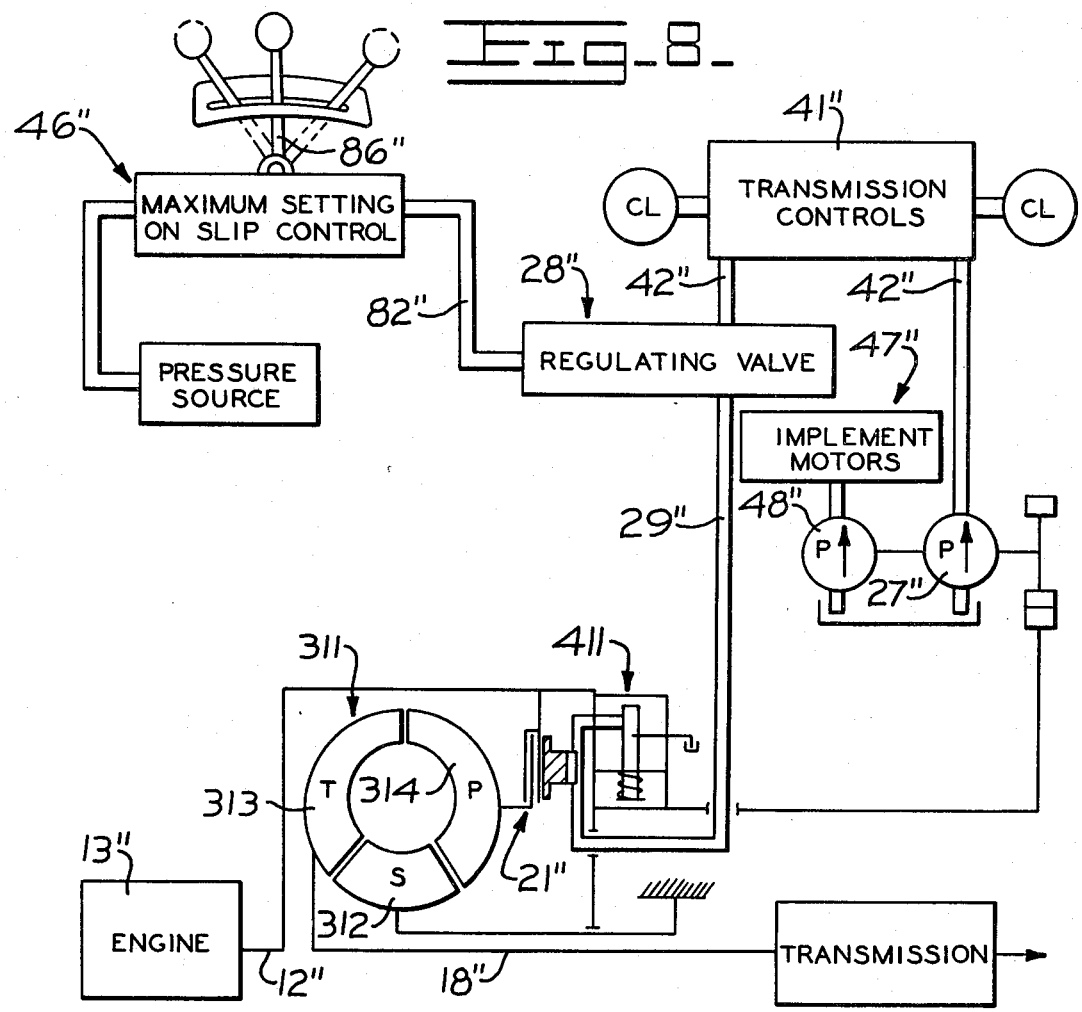

TORQUE CONVERTER WITH SPEED RESPONSIVE SLIP CLUTCH

This is a division of Ser. No. 304,492, filed Nov. 7, 1972, and now U.S. Pat. No. 3,831,726, and a continuation of Ser. No. 86,793, filed Nov. 4, 1970, and now abandoned.

The present invention relates to a variable control means for regulating power transmission between a power input member and a power output member of a drive train. More particularly, the invention contemplates such a drive train wherein variable power requirements are separately associated with the input and output members, a slipping clutch being arranged therebetween and responsive to the variable control means to selectively match or mismatch power delivered by the prime mover with the varying power requirements.

In a preferred embodiment of the invention, the drive train is part of an earthmoving machine, the slipping clutch being effective to selectively match prime mover power capabilities with variable power requirements for ground wheels of the machine and one or more earthmoving implements. The vehicle wheels are preferably coupled to the output member and the implements to the input member. In such an arrangement, the slipping clutch of the present invention may be regulated to selectively apportion power output of the prime mover between the ground engaging wheels and the implements within variable limits established by the machine operator according to the instant phase of operation.

Accordingly, the present invention provides controls within the drive train of such a machine for avoiding undesirable wheel spinning and reducing tire wear while permitting maximum power transmission to the implements and/or substantially increased power transmission to the ground wheels of the machine at the option of the machine operator.

In certain embodiments of the invention, the input and output members are portions of a torque converter. The torque converter has a variable power transmission capacity normally matched to a specific application or operational phase. Variable blading is sometimes used in such torque converters for varying or grading its power absorption capacity. However, such arrangements are complex and expensive. The present invention on the other hand, provides a simple control system whereby a full match or selective mismatch of the torque converter capacity may be instantly achieved relative to the power requirements for the implements and the ground wheels. In other words, the machine operator may, at his option, grade the absorption capacity of the torque converter or vary maximum and minimum levels of torque converter absorption capacity according to instant job requirements.

The use of a slipping clutch within a drive train is known in the prior art. For example, reference may be had to U.S. Pat. No. 3,424,029, issued to J. Horsch et al. on Jan. 28, 1969, and U.S. Pat. No. 3,478,621, issued to L. E. Johnson et al. on Nov. 18, 1969, both of which have been assigned to the assignee of the present invention. In one of these references, the patent first noted above, a slipping clutch is arranged across the power input means which couples a prime mover with the torque converter. In the other reference, a similar slipping clutch is arranged between two internal members of the torque converter, for example, a split impeller. In either of these arrangements, the slipping clutch may be gradually engaged or released to vary power absorption in the torque converter.

One problem toward which the present invention is directed lies in the close control which is necessary over the slipping clutch in order to accurately determine the amount of power which is transmitted through a torque converter.

The present invention provides very accurate control of the connecting means or slipping clutch through the provision of a regulating valve from which output fluid is delivered at a preselected pressure. A control valve includes metering valve means for establishing operating fluid pressure in the connecting means while being responsive to the rate of rotation for a member within the drive train. A control system of this type for operating the connecting means offers an additional advantage in that the metering valve means is a reducing valve which delivers fluid only as needed to actuate the connecting means and otherwise conserves fluid within the control system.

Another problem toward which the present invention is directed lies in the location of the connecting means or slipping clutch within the drive train. To simplify construction and fluid circulation for cooling and lubricating various portions of the drive train, it may be desired to position the connecting means within a housing where it is exposed to variable fluid pressures. For example, in the second reference noted above, the connecting means is located within the torque converter housing. The connecting means may be somewhat responsive to variable fluid pressure within the housing. One method of eliminating such transient effects on the connecting means would be to seal it from the housing interior. However, this solution would increase complexity within the housing. Within the present invention, the control system for delivering actuating fluid to the connecting means is responsive to the variable fluid pressure in order to compensate for any tendency of the connecting means to be operated by the variable fluid pressure.

The present invention further contemplates means such as transmission control means for adjusting drive output from the power output means. For example, where the drive train is employed within a vehicle of the type referred to above, transmission control means are employed to establish directional and range drive ratios by which the output means are coupled to the vehicular wheels. In order to make the drive train more smoothly responsive to adjustments by the transmission control means, a control valve assembly for delivering actuating fluid to the connecting means is responsively associated with the transmission control means so that the connecting means are disengaged during adjustment of the drive connecting means are disengaged during adjustment of the drive output by the transmission control means.

Accordingly, it is an object of the present invention to provide a drive train having a prime mover coupled to power input means and connecting means for controlling relative rotation of the power input means and power output means within the drive train with a control system for accurately operating the connecting means.

It is a further object to provide such a drive train wherein the input and output means are portions of a torque converter.

It is also an object of the invention to provide connecting means for operatively associating two elements of a torque converter with control means for accurately regulating operation of the connecting means.

It is another object of the present invention to provide for accurate control of such connecting means being exposed to variable fluid pressure.

It is a further object of the invention to provide a drive train having a prime mover coupled with power input means of a torque converter and connecting means for associating two elements of the drive train with control valve means for regulating the connecting means being responsive to transmission control means which are also associated with the drive train.

Additional objects and advantages of the present invention are made apparent in the following description having reference to the accompanying drawings.

IN THE DRAWINGS

FIG. 2 is a fragmentary view, with parts in section, of valve components within the control system for operating the slipping clutch of FIG. 1;

FIG. 3 is a graphic representation of converter input torque versus engine input speed for a preferred embodiment of the present invention;

Figure 1:
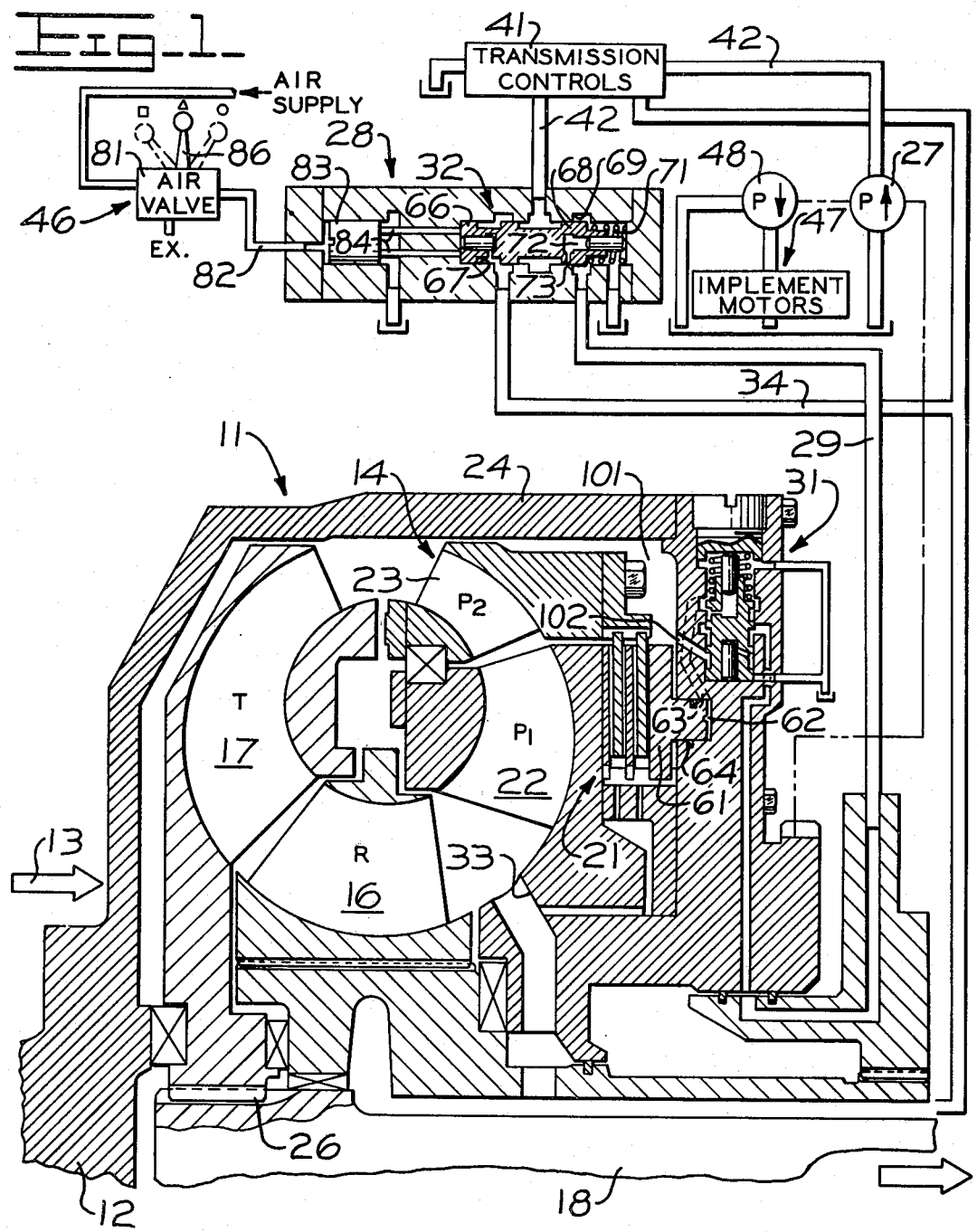
FIG. 1 is a generally schematic representation, with parts in section, of a drive train including a torque converter and connecting means such as a slipping clutch with emphasis on the torque converter, the slipping clutch, and a control system for regulating operation of the slipping clutch.

FIG. 4 graphically represents a trade for clutch engagement pressure versus engine input speed for the same embodiment of the invention;

FIG. 5 is a schematic illustration of a drive train similar to FIG. 1 while representing another embodiment of the invention without a torque converter;

FIG. 6 is also a schematic illustration of another embodiment of the invention which is generally a simplified version of that shown in FIG. 1;

FIG. 7 is a fragmentary schematic illustration of another embodiment of the invention similar to that of FIG. 6 but including a different type of torque converter; and FIG. 8 is a schematic representation of another embodiment of the invention generally similar to that shown in FIG. 7 but including a different type of centrifugal valve for adjusting the slipping clutch.

FIG. 1 represents a portion of a drive train which embodies novel features of the present invention. A torque converter 11 includes power input means 12 coupled for rotation with a prime mover 13. Power is delivered through the torque converter by impeller means 14, stator means 16 and turbine means 17 to power output means 18 of the torque converter.

Connecting means, preferably a slipping clutch 21, operatively associates two elements of the drive train between the prime mover and power output means for controlling relative rotation of the two elements and varying power delivery through the torque converter. As seen in FIG. 1, the two elements are preferably embodied as separate elements 22 and 23 of the impeller means 14. As may be further seen in FIG. 1, the impeller section 22 is coupled for rotation with the converter housing 24 which is likewise coupled for rotation with the power input means 12. Within the torque converter housing, the turbine 17 is secured for rotation with the power output means 18 by a spline arrangement indicated at 26.

A control system or valve assembly for operating the slipping clutch 21 includes a source of fluid under pressure such as the pump 27, a regulating valve 28 for delivering output fluid at a preselected pressure through a conduit 29 and a control valve 31 which meters actuating fluid to the slipping clutch 21.

With the slipping clutch arranged in the drive train as shown in FIG. 1, it is necessary to closely regulate operation of the slipping clutch in order to accurately determine the rate of relative rotation between the two elements of the drive train such as the impeller sections 22 and 23. To accomplish this purpose, the regulating valve includes servo means 32 responsive to a fluid signal of varying pressure for delivering fluid from the pump 27 into the conduit 29. In the embodiment of FIG. 1, the fluid signal is communicated to the servo means from an inlet chamber 33 of the torque converter by means of a conduit 34. Fluid from the conduit 29 is metered to the slipping clutch by means of the control valve 31 which is responsive to the rate of rotation of a member within the drive train, preferably the torque converter housing 24, and also to fluid pressure which is metered to the slipping clutch by the control valve. The control valve 31 is designed to communicate increasing fluid pressure to the slipping clutch as the torque converter housing is accelerated beyond a preselected speed of rotation.

When the engine or prime mover lugs down (for example, below 1800 r.p.m.) with such an arrangement, the control system partially diverts engine power from the output means and transmission (not shown) to a pump 48, thus satisfying the more or less temporary but high variable power requirements of implement motor means 47.

As is also apparent from FIG. 1, the slipping clutch 21 is exposed to variable fluid pressure developed within the housing 24 by operation of the torque converter 11. This variable pressure would normally cause some operation of the slipping clutch so that it would not be accurately responsive to the control valve 31. To overcome this problem, the control valve 31 is also made responsive to the variable fluid pressure within the torque converter housing in order to compensate for any tendency of the variable fluid pressure to operate the slipping clutch 21.

The drive train of FIG. 1 is contemplated for use with a transmission for adjusting the drive output from the power output means of the torque converter. The transmission is represented by transmission control means which are indicated at 41.

The present invention further contemplates the control system for operating the slipping clutch 21 as being responsive to the transmission control means in order to reduce undesirable power surges during shifting and accordingly to provide for smoother operation of the drive train during shifting of the transmission control means. To accomplish this purpose, fluid from the pump 27 is delivered to the regulating valve 28 through the transmission control means 41. The transmission control means are of conventional construction and operation. For purposes of the present invention, it is only necessary that the transmission control means provide free fluid communication between the pump 27 and regulating valve 28 through a conduit 42 except when the drive output from the power output means 18 is being adjusted by the transmission control means.

During these intervals, the transmission control means isolates the pump 27 from the regulating valve. Thus, the flow of actuating fluid to the slipping clutch 21 is interrupted to insure that the two members, for example the impeller sections 22 and 23, are momentarily disengaged immediately following adjustment of the transmission control means.

The system of FIG. 1 further includes manual control means 46 which are associated with the servo means 32 of the regulating valve in order to vary the pressure of fluid delivered into the conduit 29 and accordingly to adjust the rotational speed at which engagement of the two impeller sections 22 and 23 is commenced by means of the slipping clutch 21.

As noted above, the drive train embodiment of FIG. 1 is designed to provide locomotive power through the power output means 18 of the torque converter. Implement motor means such as that indicated at 47 are designed to be operated in direct response to the prime mover 13 and the power input means 12 of the torque converter. As indicated in FIG. 1, one or more pumps 48 of the implement motor means are coupled for rotation with the torque converter housing together with the hydraulic pump 27. In this manner, the slipping clutch 21 is effective to selectively give priority over power from the prime mover 13 to the implement motor means at the expense of the power output means 18 of the torque converter.

Power division provided by the slipping clutch is illustrated in FIGS. 3 and 4. Having particular reference to FIG. 3, when the power input means 12 and the converter housing 24 are rotating at relatively low speed, the impeller section 23 is uncoupled from the impeller section 22 with the input torque to the power input means 12 represented at 51 in FIG. 3. As the converter housing is accelerated to higher speeds, the control system causes the clutch 21 to increase engagement between the impeller sections until they are completely coupled for rotation. The input torque for the converter input means 13 under this condition is represented at 52 in FIG. 3. A transition range 53 represents variable engagement between the two impeller sections 22 and 23 by the clutch 21. The maximum input torque absorption at the end of the transition range 53 may be adjusted by the manual control 46 to provide wheel slip control and to maintain a maximum operating level as indicated by a broken line 54 in FIG. 3.

Engagement pressure for the clutch 21 is represented in FIG. 4. The engagement pressure as represented at 51' is initially zero so that the impeller sections are uncoupled during low speed operation corresponding to portion 51 of FIG. 3. Clutch engagement pressure is gradually increased over a transition range 53' until maximum clutch engagement pressure is provided at 52' which corresponds to complete engagement between the impeller sections 22 and 23 as represented by portion 52 of FIG. 3. Thus, as may be seen more clearly from FIG. 3, while power input means 12 is rotating at relatively low speeds because of the significant power demands placed upon the prime mover by the implement system, a relatively small proportion of power may be transmitted by the torque converter output means 18. Conversely, during relatively high speed rotation when power demand by the implement system is lower, the power division is reversed so that a relatively large amount of power is absorbed by the torque converter and delivered to the power output means 18.

Particular components of the drive train and control system as described in greater detail below having reference to both FIG. 1 and 2.

Referring to FIG. 1, actuation of the clutch 21 is controlled by a piston 61 which forms a fluid actuating chamber 62. Fluid communication between the conduit 29 and the actuating chamber 62 is metered by the control valve 31 into a passage indicated at 63. Because the actuating chamber 62 is isolated from the interior of the torque converter housing by a seal indicated at 64, a larger surface at the left side of the clutch 21 as viewed in FIG. 1 is exposed to variable fluid pressure within the torque converter housing so that the clutch tends to be disengaged by the variable fluid pressure developed within the converter.

The servo valve means 32 is preferably embodied as a spool 66 reciprocally mounted within a bore 67 of the regulating valve 28. As the spool 66 is shifted rightwardly from the position shown in FIG. 1, a land 68 cooperates with an annular recess 69 which is in communication with the conduit 29 to regulate fluid pressure within the conduit 29. The spool tends to be shifted rightwardly by fluid from the conduit 34 which is in communication with the left end of the spool. Motion of the spool is modulated by a spring 71 and fluid pressure from the annular recess 69 which is communicated into a slug chamber 72 by means of passages 73.

Rightward biasing of the spool 66 may be adjusted by operation of the manual control means 46. The control means 46 includes an air valve 81 which admits air under pressure through a conduit 82 into the regulating valve 28 to act upon a load piston 83. The load piston 83 acts upon the spool 66 by means of push pins 84. Variable air pressure is delivered against the load piston 83 by adjustment of a hand lever 86 on the air valve 81. As additional air pressure is supplied against the load piston 83, the spool 66 tends to be shifted further rightwardly so that pressure within the conduit 29 is increased.

The control valve 31 is more clearly shown in FIG. 2 together with the regulating valve 28. The association of the control valve 31 with the clutch piston 61 is shown in somewhat schematic fashion relative to the more detailed arrangement of FIG. 1 for simplicity.

The control valve 31 includes a spool 91 which is reciprocally mounted in a radially arranged bore 92 formed by a portion of the torque converter housing 24. The spool 91 is urged radially inwardly by a spring 93. Thus, the spool tends to be shifted radially in response to the rate of rotation of the torque converter housing 24 while spring 93 sets the point B (FIG. 3) for a given converter pressure. Fluid from the conduit 29 is communicated into the bore by means of an annular recess 94. A land 96 enters into register with an annular recess 97, which is in communication with the conduit 63, so that fluid is metered into the actuating chamber 62 as the spool 91 is shifted radially outwardly in response to increasing rotational speeds of the converter housing 24. Actuating fluid pressure within the chamber 62 is also communicated into a slug cavity 98 through a passage 99. Thus, fluid pressure in the actuating chamber 62 tends to shift the spool 91 radially inwardly within its bore 92.

In order to compensate for variable fluid pressure within the torque converter housing, fluid from the outer torus 101 of the torque converter (See FIG. 1) is communicated into the bore 92 through a passage 102.

The passage 102 is in communication with another slug cavity 103 by means of an annular slot 104 in the spool and a passage 106. Thus, increasing fluid pressure within the torque converter housing tends to shift the spool radially outwardly in order to increase pressure within the actuating chamber 62 and compensate for operation of the clutch 21 by means of the variable fluid pressure within the converter interior 101.

FIG. 5 represents another embodiment of the present invention. Many of the components are similar to those described with reference to FIG. 1, except that internal variations in pressure within the rotating housing are not compensated for, and are accordingly indicated by similar prime numerals. Further, the connection of the slipping clutch 21' with the prime mover 13' is different from that illustrated in FIG. 1. A power input member 211 couples the prime mover with one side of the slipping clutch 21' and with the implement motor means 47'. The control valve 31' is also associated with the input member 211. The other side of the slipping clutch is coupled with a power output member 212 and a transmission 213 for the drive train.

With this arrangement, operation of the slipping clutch and distribution of power between the implement means 47' and the output member 212 is accomplished in a similar manner by the control valve 31' and the regulating valve 28°.

The manual control means 46' is accordingly similarly effective to limit the pressure of fluid delivered into the conduit 29' and thereby provide a maximum level of torque absorption by slipping clutch 21'.

The mechanical control 46' biases the regulating valve 28' in a similar manner as described with referenc to FIG. 1 by positioning its lever 86' in the same manner as described above with reference to lever 86 of FIG. 1. In this embodiment, the lever 86' is mechanically coupled directly to the regulating valve 28'.

The embodiment of FIG. 5 also includes a sequence or priority valve 214 having a spool 216 which is operable to block line 42' when pressure in that line falls below a selected level, for example, 270 psi. During a shift, main rail pressure in line 42' of approximately 300 psi, for example, drops rapidly because new clutches are being filled so that spool 216 moves to the right, by virtue of its spring loading, to shut off fluid flow to the regulating valve 28' and the control valve 31'. This reduces pressure to the actuating piston and places the clutch in a condition of slip. Regulating valve 28' is set by manual means 46' within the range of 40 to 100 psi for example (See FIG. 4). If the setting is selected at 70 psi, for example, valve 31' serves to control the pressure for operating the actuating piston from 0 to 70 within the speed range of 1600 to 1750 rpm (See FIG. 4). If engine speed increases beyond 1750 rpm, the centrifugal valve then serves no effective function since it is fully opened and passes all fluid from conduit 29' as limited by the regulating valve 28'.

The components of FIG. 6, being generally similar to those of the embodiments of FIGS. 1 and 5, are indicated by similar double prime numerals. In this embodiment also the control valve 31" is responsive only to rotational speed, the regulating valve 28" and the manual control means 46". It is not responsive to pressure surges within the torque converter housing (See FIG. 1) where the slipping clutch is arranged.

The embodiment of FIG. 7 includes the same elements, similarly numbered, as in FIG. 6, except that a three element torque converter 311 is employed rather than the four element converter 11" of FIG. 6. The three elements include the stator 312, turbine 313 and impeller 314. The arrangement of the torque converter 311 in the dirve train is similar to that for the converter 11" in the drive train of FIG. 6 except that the slipping clutch is coupled on one side only to the input means or converter housing and on the other side to the single impeller 314.

The embodiment of FIG. 8 includes the same elements, similarly numbered, as in FIG. 7, except that a relief type centrifugal metering valve 411 is employed in place of the reducing type control valve 31'". Such a relief type valve is illustrated and described in greater detail in U.S. Pat. No. 3,424,029, issued Jan. 28, 1969, to J. Horsch et al. and assigned to the assignee of the present invention.

Accordingly, various different embodiments of the present invention have been disclosed. It is apparent that various components may be altered or replaced within the scope of the present invention. For example, the pressure surge compensation feature of FIG. 1, the reducing type control valve 31, the relief type control valve of FIG. 8 and the mechanical control 46' of FIG. 5 may also be employed in other embodiments. Further, the manual control 46 might also be pneumatically as well as hydraulically operable.

The graphical data presented in FIGS. 3 and 4 remains substantially representative for the FIGS. 1 and 6 embodiments, while the FIGS. 7 and 8 embodiments with a three-element converter transmit substantially no torque at the lower speed ranges as shown by broken line 55 on FIG. 3. Also, establishing a maximum pressure setting to the clutch actuating pistons of FIGS. 7 or 8 (such as indicated by broken line 54' in FIG. 4) provides a maximum input torque operating level as indicated by a broken line 56 in FIG. 3. Use of either the "metering-in" reducing type valve of FIG. 1 or the "metering-out" relief type valve of FIG. 8 appears to result in similar performance curves.

What is claimed is:

1. A torque converter including power input means, two section impeller means, stator means, turbine means and power output means and comprising connecting means arranged for connecting with two normally separately rotatable elements of the torque converter, said connecting means being hydraulically operable for varying power transmission through the converter, a source of fluid under pressure, a regulating valve associated with said source for transmitting fluid therefrom at a maximum pressure and a control valve associated with said regulating valve to receive the output fluid, said control valve having means in communication with said regulating valve and said connecting means, said control valve means being responsive to rotational speed of a member in the torque converter and pressure of the fluid metered to the connecting means to adjust the communication of the output fluid pressure to the connecting means, manual control means being operatively coupled with the regulating valve to selectively vary the maximum pressure of output fluid received by the control valve, wherein the sections of the impeller means of the torque converter comprises two elements which are connected by the connecting means, said connecting means comprising a slipping clutch, wherein the regulating valve comprises servo means for adjusting the preselected pressure of the output fluid, means for communicating a fluid signal from a portion of the converter to the servo means, the servo means being responsive to the fluid signal received from a portion of the converter and to the manual control means.

2. A torque converter including power input means, two section impeller means, stator means, turbine means and power output means and comprising connecting means arranged for connecting two normally separately rotatable elements of the torque converter, said connecting means being hydraulically operable for varying power transmission through the converter, a source of fluid under pressure, a regulating valve associated with said source for transmitting fluid therefrom at a maximum pressure and a control valve associated with said regulating valve to receive the output fluid, said control valve having means in communication with said regulating valve and said connecting means, said control valve means being responsive to rotational speed of a member in the torque converter and pressure of the fluid metered to the connecting means for adjusting the communication of the output fluid pressure to the connecting means, manual control means being operatively coupled with the regulating valve to selectively vary the maximum pressure of output fluid received by the control valve, wherein the sections of the impeller means of the torque converter comprises the two elements which are connected by the connecting means, said connecting means comprising a slipping clutch, wherein the regulating valve comprises servo means for adjusting the preselected pressure of the output fluid, the servo means being responsive to a fluid signal received from a portion of the converter and to the manual control means, wherein the fluid signal is communicated to said servo means from an inlet fluid chamber of the torque converter.

* * * * *